United States Patent
Moon et al.

(10) Patent No.: US 6,833,889 B2
(45) Date of Patent: Dec. 21, 2004

(54) CHOLESTERIC LIQUID CRYSTAL DISPLAY DEVICE WITH REFLECTORS AND MANUFACTURING METHOD FOR THE SAME

(75) Inventors: Jong-Weon Moon, Annyang-si (KR); Sung-Hoe Yoon, Annyang-si (KR)

(73) Assignee: G. Philips LCD Co., Ltd., Seoul (KR)

( * ) Notice: Subject to any disclaimer, the term of this patent is extended or adjusted under 35 U.S.C. 154(b) by 368 days.

(21) Appl. No.: 10/076,452

(22) Filed: Feb. 19, 2002

(65) Prior Publication Data

US 2002/0113765 A1 Aug. 22, 2002

(30) Foreign Application Priority Data

Feb. 19, 2001 (KR) ..................................... 10-2001-8248

(51) Int. Cl.[7] .......................... G02F 1/1335; G02F 1/13
(52) U.S. Cl. ...................... 349/106; 349/96; 349/113; 349/115; 349/117; 349/187
(58) Field of Search ......................... 349/96, 106, 113, 349/115, 117, 187

(56) References Cited

U.S. PATENT DOCUMENTS

| | | | |
|---|---|---|---|
| 5,929,956 A | | 7/1999 | Neijzen et al. |
| 6,025,899 A | * | 2/2000 | Fukunaga et al. .......... 349/115 |
| 6,072,549 A | * | 6/2000 | Faris et al. ..................... 349/16 |
| 6,597,418 B2 | * | 7/2003 | Moon et al. ................... 349/98 |
| 6,621,543 B2 | * | 9/2003 | Moon .......................... 349/115 |
| 6,693,689 B1 | * | 2/2004 | Kim et al. .................... 349/113 |
| 2002/0047965 A1 | * | 4/2002 | Suzuki et al. ................ 349/113 |

FOREIGN PATENT DOCUMENTS

KR 2000-0061782 10/2000

* cited by examiner

Primary Examiner—Tarifur R. Chowdhury
(74) Attorney, Agent, or Firm—McKenna Long & Aldridge LLP

(57) ABSTRACT

A reflective cholesteric liquid crystal (CLC) display device has a reflection layer in or on a cholesteric liquid crystal color filter to increase a luminance and a contrast ratio of a liquid crystal display device. A reflective cholesteric liquid crystal display device includes a first substrate, an absorption layer on the first substrate, a cholesteric liquid crystal color filter on the absorption layer, a reflection layer on the absorption layer, the reflection layer reflecting light in a whole range of wavelengths, a first electrode on the cholesteric liquid crystal (CLC) color filter, a second substrate spaced apart from and over the first substrate, a second electrode beneath the second substrate, a retardation layer on the second substrate, a polarizer on the retardation layer and a liquid crystal layer between the first electrode and the second electrode.

24 Claims, 3 Drawing Sheets

[Fig. 1]
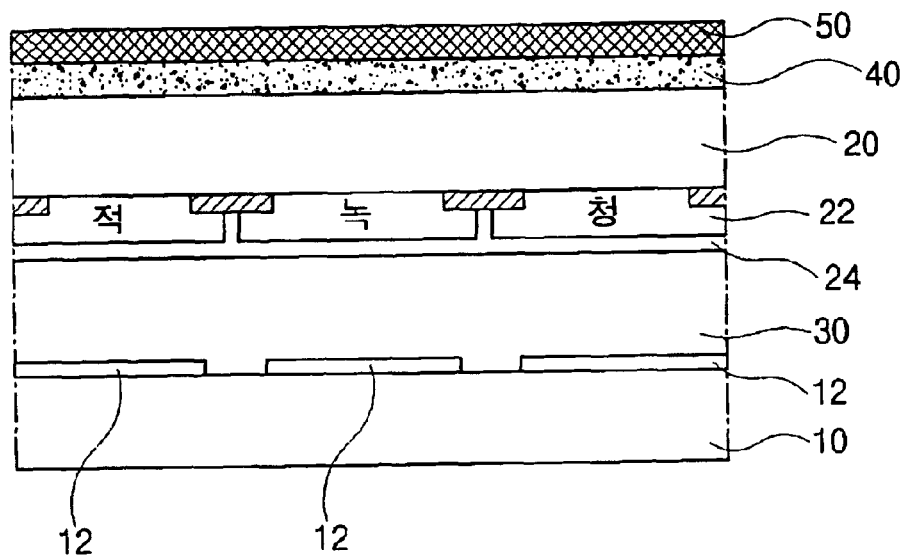
[Fig. 2]
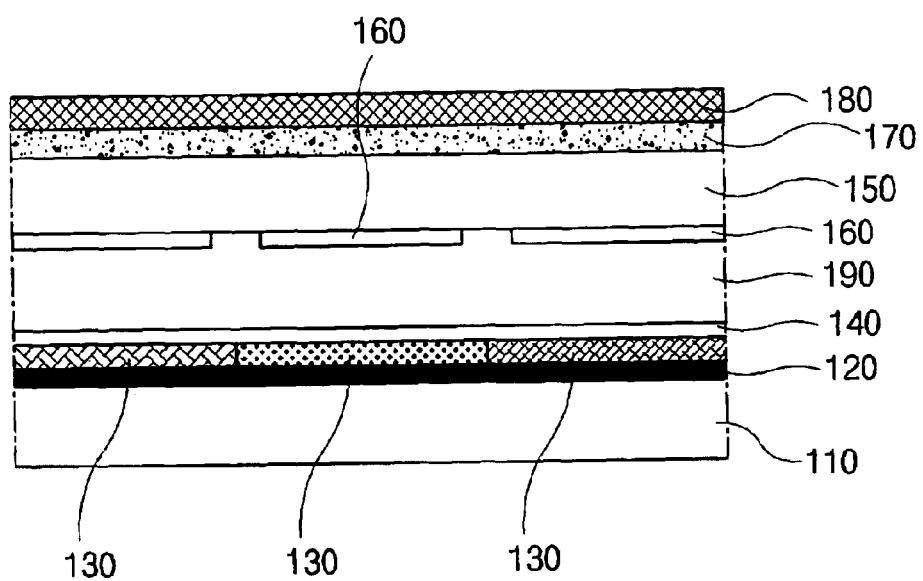

[Fig. 3]
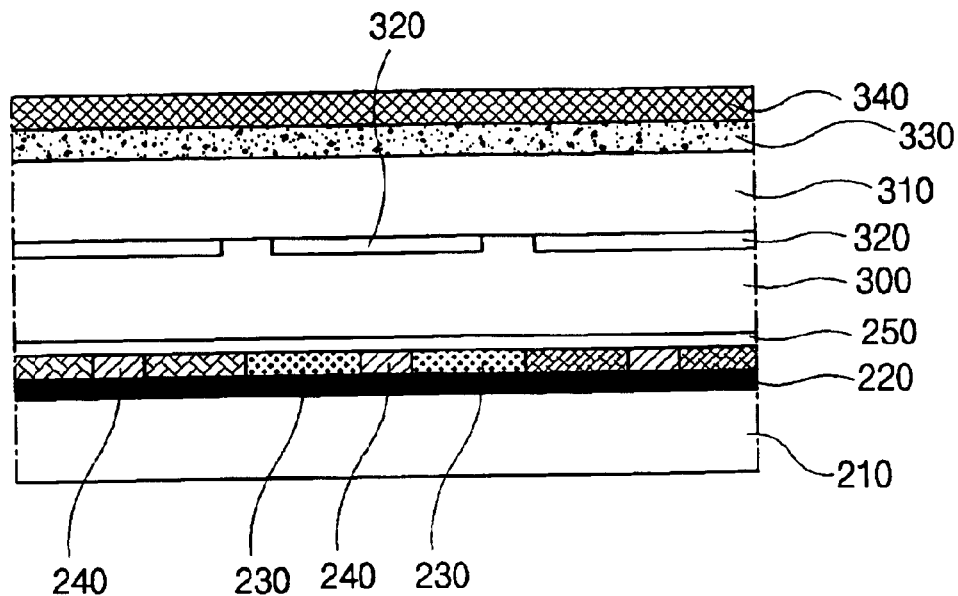
[Fig. 4]
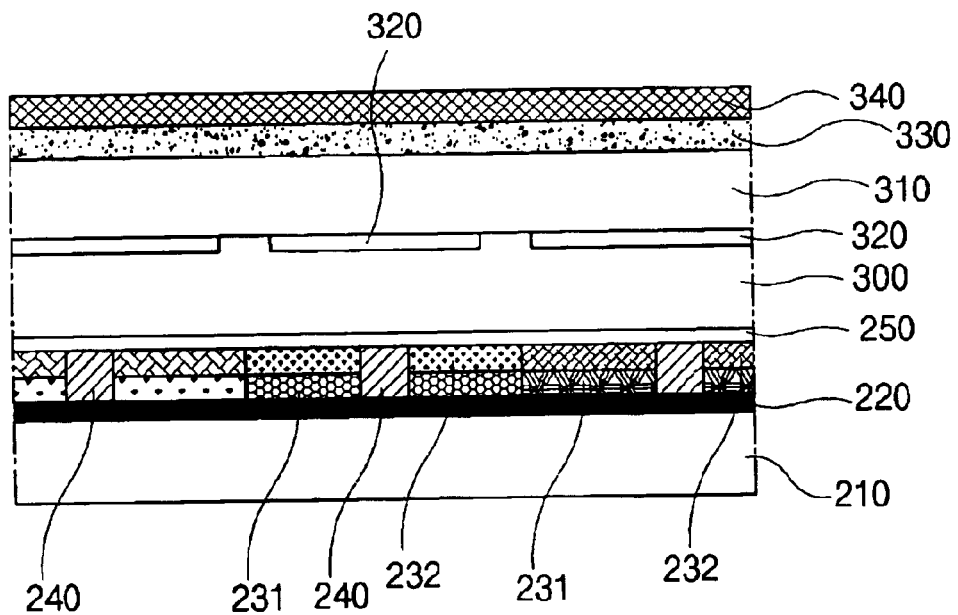

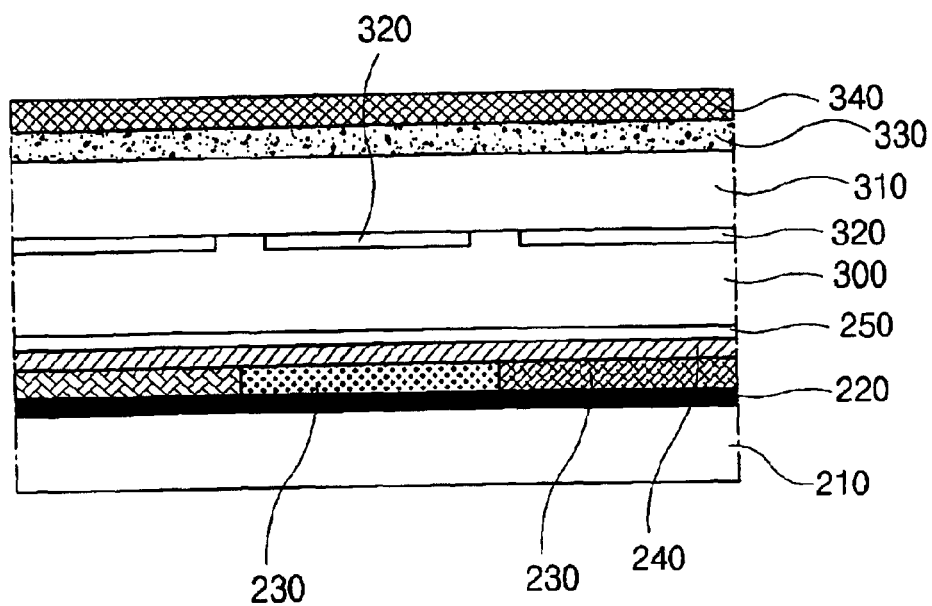
[Fig. 5]

CHOLESTERIC LIQUID CRYSTAL DISPLAY DEVICE WITH REFLECTORS AND MANUFACTURING METHOD FOR THE SAME

This application claims the benefit of Korean Patent Application No. 2001-08248, filed on Feb. 19, 2001 in Korea, which is hereby incorporated by reference for all purposes as if fully set forth herein.

BACKGROUND OF THE INVENTION

1. Field of the Invention

The present invention relates to a liquid crystal display (LCD) device and more particularly, to a reflective cholesteric liquid crystal (CLC) display device and a manufacturing method for the same.

2. Discussion of the Related Art

Flat panel display devices, which have properties of thin, low weight and low power consumption, have been required as the information age rapidly evolves. Flat panel display devices may be classified into two types depending on whether the device emits light or not. One type is a light-emitting type display device that emits light to display images, and the other is a light-receiving display device that uses an external light source to display images. Plasma display panels (PDPs), filed emission display (FED) devices and electro luminescence (EL) display devices are examples of the light-emitting type display devices, and liquid crystal displays are an example of the light-receiving type display device. The liquid crystal display device is widely used for notebook computers and desktop monitors, etc. because of its superior resolution, color image display and quality of displayed images.

Generally, the liquid crystal display device has upper and lower substrates, which are spaced apart and facing each other. Each of the substrates includes an electrode, and the electrodes of each substrate are facing each other. Liquid crystal is interposed between the upper substrate and the lower substrate. Voltage is applied to the liquid crystal through the electrodes of each substrate, and thus an alignment of the liquid crystal molecules is changed according the applied voltage to display images. Because the liquid crystal display device cannot emit light as described before, it needs an additional light source to display images. Accordingly, the liquid crystal display device has a back light behind a liquid crystal panel as a light source. An amount of light incident from the back light is controlled according the alignment of the liquid crystal molecules to display images. The electrodes of each substrate are formed of transparent conductive material and the substrates must be transparent. The liquid crystal display devices like this are called transmissive liquid crystal display devices. Because the transmissive liquid crystal display device uses an artificial light source such as the back light, it can display a bright image in dark surroundings. However, the transmissive liquid crystal display device has high power consumption.

The reflective liquid crystal display device has been suggested to overcome the power consumption problem of the transmissive liquid crystal display device. Because the reflective liquid crystal display device controls transmittance according the alignment of liquid crystal molecules by irradiating light using an external light source such as ambient light or artificial light, it has a low power consumption compared with the transmissive liquid crystal display device. In the reflective liquid crystal display device, an electrode on the lower substrate is formed of conductive material that has a high reflectance, and an electrode on the upper substrate is formed of transparent conductive material to transmit the incident light.

The conventional reflective liquid crystal display device will be described hereinafter more in detail with reference to FIG. 1. FIG. 1 is a cross-sectional view of a conventional reflective liquid crystal display device. In the conventional liquid crystal display device of FIG. 1, a plurality of switching elements (not shown) are formed in an array matrix on a first substrate 10 and a plurality of reflective electrodes 12, which are respectively connected to each of the switching elements, is formed on the first substrate 10. The reflective electrode 12, which is formed of conductive material such as metal, reflects the incident light and serves as a pixel electrode. A color filter 22, which includes sub-color-filters red (R), green (G), and blue (B) in a repeated order, is formed beneath a second substrate 20 and corresponds to the reflective electrode 12. A common electrode 24 is formed of transparent conductive material beneath the color filter 22. Liquid crystal is interposed between the reflective electrode 12 and the common electrode 24. An alignment of liquid crystal molecules is changed if a voltage is applied between the reflective electrode 12 and the common electrode 24.

A retardation layer 40 is formed on the second substrate 20. The retardation layer 40 of the conventional reflective liquid crystal display device of FIG. 1 has a phase difference of $\lambda/4$ and thus is called a quarter wave plate. The quarter wave plate 40 changes a linear polarization of light into a circular polarization of light and the circular polarization into the linear polarization. A polarizer 50, which changes ambient light into linearly polarized light by transmitting only the light that is parallel to a light transmission axis, is formed on the quarter wave plate 40. If the ambient light is irradiated to the reflective liquid crystal display device when the voltage is not applied, the incident light is changed into linearly polarized light as it passes through the polarizer 50, and the linearly polarized light is changed into circularly polarized light as it passes through the quarter wave plate 40. The circularly polarized light then passes through the second substrate 20, the color filter 22 and the common electrode 24 in sequence, and there is no phase change during this process. The circularly polarized light then passes through the liquid crystal layer 30. If the liquid crystal layer 30 is formed to have a phase difference of $\lambda/4$ the circularly polarized light is changed into linearly polarized light as it passes through the liquid crystal layer 30. The linearly polarized light is reflected at the reflective electrode 12 and then is changed into circularly polarized light as it passes again through the liquid crystal layer 30. The circularly polarized light is changed into the linearly polarized light as it passes again through the quarter wave plate 40, and then the linearly polarized light passes through the polarizer 50. If a polarized direction of the linearly polarized light is parallel to the light transmission axis of the polarizer 50, all of the linearly polarized light transmits through the polarizer 50 and if the polarized direction of the linearly polarized light is perpendicular to the light transmission axis of the polarizer 50, the linearly polarized light cannot transmit through the polarizer 50.

Because the reflective liquid crystal display device uses external light for its light source as described before, it has a low power consumption. However, because the reflective liquid crystal display device uses the external light for its light source, its luminance is changeable depending on external circumstances. In addition, the conventional reflective liquid crystal display device has a lower luminance than a transmissive liquid crystal display device under normal office environment. In addition, because the liquid crystal display device uses an absorption type color filter and thus incident light is lost at a high rate as it passes through the color filter, the conventional reflective liquid crystal display device has a rather low brightness. The absorption type color filter and the polarizer usually absorb over eighty percent of the incident light. Though the luminance can be increased by reducing a purity of the color filter in this case, there exists a limitation in increasing the luminance only by reducing the purity of the color filter.

Therefore, cholesteric liquid crystal (CLC) display devices, which use a CLC color filter to display color images, has been widely researched and developed in the field to resolve this luminance problem of the conventional reflective liquid crystal display device. The conventional reflective cholesteric liquid crystal display device, which has CLC color filter, has a superior color display ability and contrast ratio compared with the conventional reflective liquid crystal display device that has an absorption type color filter. The cholesteric liquid crystal color filter uses a selective reflection property of the cholesteric liquid crystal. The cholesteric liquid crystal does not reflect all incident light, but selectively reflects the incident light of a particular wavelength according to a helical pitch of the cholesteric liquid crystal. Accordingly, the reflected light may display red, green or blue color by controlling the helical pitch according to each region of the CLC color filter. The cholesteric liquid crystal color filter also determines a polarization state of the reflected light. The rotational direction of the cholesteric liquid crystal helix is an important factor to a polarization phenomenon. For example, the left-handed cholesteric liquid crystal reflects a left circular polarization that has a wavelength corresponding to the pitch of the left-handed cholesteric liquid crystal. That is, a direction of a circular polarization of the reflected light depends on whether the helix structure of the cholesteric liquid crystal is right-handed or left-handed. This is a significant difference from a typical dichroic mirror that simply reflects light of particular wavelength and transmits the rest of the light.

FIG. 2 is a cross-sectional view of a reflective cholesteric liquid crystal display device that has a CLC color filter according to the related art. Because the cholesteric liquid crystal color filter serves as a reflector as well as a color filter, an additional reflector is not needed. As shown in FIG. 2, an absorption layer 120 is formed on a lower substrate 110 and a cholesteric liquid crystal (CLC) color filter 130 is formed on the absorption layer 120. The cholesteric liquid crystal (CLC) color filter 130 displays a red, green and blue color in sequence by reflecting the light of wavelength corresponding to the red, green and blue color. A first electrode 140 is formed on the cholesteric liquid crystal (CLC) color filter 130. An upper substrate 150 is over the lower substrate 110 and spaced apart from the lower substrate 110. A second electrode 160 is formed beneath the upper substrate 150. A retardation layer 170 having a phase difference value of $\lambda/4$ is formed on the upper substrate 150, and a polarizer 180 is formed on the retardation layer 170. A liquid crystal layer 190 is interposed between the first electrode 140 and the second electrode 160. Alignment of the liquid crystal is changed according to the electric field between the first electrode 140 and the second electrode 160. However, the reflective cholesteric liquid crystal display device using the cholesteric liquid crystal (CLC) color filter still has rather low luminance.

A width of reflection wavelength ($\Delta\lambda$) of the cholesteric liquid crystal (CLC) color filter can be numerically expressed as follow:

$$\Delta n = n_e - n_o$$

$$\Delta\lambda = \Delta n \cdot P$$

where, $n_e$ is a refractive index for extraordinary light, $n_o$ is a refractive index for ordinary light, $\Delta n$ is a refractive index anisotropy value of the cholesteric liquid crystal (CLC) material, P is a helical pitch of the cholesteric liquid crystal (CLC) and $\Delta\lambda$ is a width of refraction wavelength of the cholesteric liquid crystal (CLC) color filter. A width of reflection wavelength of the cholesteric liquid crystal (CLC) color filter is a function of a refractive index anisotropic value and the helical pitch of the cholesteric liquid crystal (CLC). Therefore, the wavelength width of the light that is reflected to display the red, green and blue color when the cholesteric liquid crystal (CLC) is aligned completely depends only on characteristics of the cholesteric liquid crystal (CLC) material, and a maximum degree of reflection is maintained over a certain thickness of the cholesteric liquid crystal (CLC) color filter. Accordingly, even though the luminance of the reflected light can be increased by reducing the color purity by controlling absorption degree and thickness of the color filter in the convention reflective liquid crystal display device, the luminance of the reflected light may not be easily increased by reducing the color purity by controlling the thickness of the cholesteric liquid crystal (CLC) color filter in the cholesteric liquid crystal (CLC) display device. There are a few methods for increasing the luminance of the reflected light when a single layered cholesteric liquid crystal (CLC) color filter is used. For example, if the liquid crystal is aligned incompletely, the range of wavelengths of the light reflected is enlarged, which reduces the color purity. As the color purity is reduced, the luminance of the reflected light increases. For another example, the luminance of the reflected light can be increased by enlarging the width of the reflection wavelength by mixing the cholesteric liquid crystal (CLC) color filter materials that have different characteristics and controlling a diffusion and a response speed of the materials. However, each of those two methods has disadvantages. That is, mixing the CLC color filter materials having different characteristics causes a reduction in the degree of the reflection in a main wavelength range. Therefore, the luminance increase effect is not adequate. Moreover, controlling diffusion and response speed of the materials is not effective because it is difficult to display the red, green and blue color clearly because of the response mechanism of the cholesteric liquid crystal (CLC) color filter.

SUMMARY OF THE INVENTION

Accordingly, the present invention is directed to a reflective cholesteric liquid crystal (CLC) display device and a manufacturing method of the reflective cholesteric liquid crystal (CLC) display device that substantially obviates one or more of problems due to limitations and disadvantages of the related art.

An advantage of the present invention is to provide a reflective cholesteric liquid crystal (CLC) display device that has a cholesteric liquid crystal (CLC) color filter and a reflection layer for a whole range of wavelengths or the entire spectrum of visible light to increase a luminance and a contrast ratio.

Another advantage of the present invention is to provide a manufacturing method of a reflective cholesteric liquid crystal (CLC) display device that has a cholesteric liquid crystal (CLC) color filter and a reflection layer for the whole range of wavelengths the entire spectrum of visible light.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a reflective cholesteric liquid crystal (CLC) display device comprises a first substrate, an absorption layer on the first substrate, a cholesteric liquid crystal (CLC) color filter on the absorption layer, a reflection layer on the absorption layer, the reflection layer reflects light in a range of wavelength, a first electrode on the cholesteric liquid crystal (CLC) color filter, a second substrate being spaced apart from and over the first substrate, a second electrode beneath the second substrate, a retardation layer on the second substrate, a polarizer on the retardation layer and a liquid crystal layer between the first electrode and the second electrode. The reflection layer may contact the cholesteric liquid crystal (CLC) color filter laterally or may be formed on a whole area of the first substrate in which the cholesteric liquid crystal (CLC) color filter is formed. The reflection layer may be formed of cholesteric liquid crystal (CLC) polarizer. In addition, the cholesteric liquid crystal (CLC) color filter may have at least two layers that display a same color corresponding to each pixel region but reflect light in a different range of wavelength.

A manufacturing method of a reflective cholesteric liquid crystal (CLC) display device comprises the steps of preparing a first substrate, forming an absorption layer on the first substrate, forming a cholesteric liquid crystal (CLC) color filter on the absorption layer, forming a reflection layer on the absorption layer, the reflection layer reflects light in a whole range of wavelengths or the whole range of visible light, forming a first electrode on the cholesteric liquid crystal (CLC) color filter and on the reflection layer, preparing a second substrate, forming a second electrode on the second substrate, disposing the first substrate and the second substrate so that the first electrode and the second electrode face each other, injecting liquid crystal between the first electrode and the second electrode, and forming a retardation layer on the second substrate and a polarizer on the retardation layer. The reflection layer may contact the cholesteric liquid crystal (CLC) color filter laterally or may be formed on a whole area of the first substrate in which the cholesteric liquid crystal (CLC) color filter is formed. The reflection layer may be formed of cholesteric liquid crystal (CLC) polarizer. In addition, the cholesteric liquid crystal (CLC) color filter may have at least two layers that display a same color corresponding to each pixel region but reflect light in a different range of wavelength.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a cross-sectional view of a conventional reflective liquid crystal display device;

FIG. 2 is a cross-sectional view of a reflective cholesteric liquid crystal (CLC) display device having a CLC color filter according to the related art;

FIG. 3 is a cross-sectional view of a reflective cholesteric liquid crystal (CLC) display device having a CLC color filter according to a first embodiment of the present invention;

FIG. 4 is a cross-sectional view of a reflective cholesteric liquid crystal (CLC) display device having a CLC color filter according to a second embodiment of the present invention; and FIG. 5 is a cross-sectional view of a reflective cholesteric liquid crystal (CLC) display device having a CLC color filter according to a third embodiment of the present invention.

DETAILED DESCRIPTION OF THE ILLUSTRATED EMBODIMENTS

Reference will now be made in detail to the illustrated embodiments of the present invention, which is illustrated in the accompanying drawings.

FIG. 3 is a cross-sectional view of a reflective cholesteric liquid crystal (CLC) display device having a CLC color filter according to a first embodiment of the present invention. As shown in the figure, a first substrate 210 and a second substrate 310 are spaced apart from each other and facing each other. The second substrate 310 is formed of transparent insulating material and the first substrate 210 may be formed of transparent insulating material or material of low transparency. An absorption layer 220 is formed on the first substrate 210 to absorb light. A cholesteric liquid crystal (CLC) color filter 230, which reflects light of particular wavelength, and a reflection layer 240, which reflects light in a whole range of wavelengths, for example, ambient light, the entire spectrum of visible light, or a subset range of the entire spectrum of visible light, are formed in pixel regions on the absorption layer 220. For example, the reflection layer 240 reflects white light. The cholesteric liquid crystal (CLC) color filter 230 selectively reflects incident light and the reflected light displays a red, green and blue color in each pixel region. The reflected light at the cholesteric liquid crystal (CLC) color filter 230 does not exactly have a single wavelength, but has a certain wavelength range on the basis of a main wavelength. In FIG. 3, the reflection layer 240 is positioned between portions of the cholesteric liquid crystal (CLC) color filter 230 corresponding to each pixel region, but the reflection layer 240 may alternatively be formed at an edge of the cholesteric liquid crystal (CLC) color corresponding to each pixel region. A first electrode 250 is formed on the cholesteric liquid crystal (CLC) color filter 230 and on the reflection layer 240 using transparent conductive material. A second electrode 320 is formed beneath the second substrate 310 using transparent conductive material. A retardation layer 330 is formed on the second substrate 310 and a polarizer 340 is formed on the retardation layer 330. The retardation layer 330 changes a polarization state of incident light. Because the retardation layer 330 has a phase difference of $\lambda/4$, the retardation layer 330 changes linearly polarized light into circularly polarized light and circularly polarized light into linearly polarized light. The polarizer 340 transmits only the light that is parallel to a light transmission axis. A diffusing plate (not shown) may further be formed between the second substrate 310 and the retardation layer 330.

Generally, a switching element, e.g., a thin film transistor (not shown), and a pixel electrode that is connected to the thin film transistor are formed on the second substrate 310 in the cholesteric liquid crystal (CLC) display device that has the cholesteric liquid crystal (CLC) color filter. Accordingly, the second electrode 320 is formed corresponding to each portion of the cholesteric liquid crystal (CLC) color filter 230 as shown in the figure. Each portion of the second electrode 320 corresponding to each portion of the cholesteric liquid crystal (CLC) color filter is connected to the thin film transistor (not shown). On the other hand, the first electrode 250 may alternatively be formed corresponding to each portion of the cholesteric liquid crystal (CLC) color filter 230 and serve as the pixel electrode. Accordingly, each portion of the first electrode 250, which corresponds to each portion of the cholesteric liquid crystal (CLC) color filter, may be connected to the thin film transistor (not shown) that is formed on the first substrate 250.

There is a liquid crystal layer 300 between the first electrode 250 and the second electrode 320. Alignment of liquid crystal molecules in the liquid crystal layer 300 is changed according to an electric field between the first electrode 250 and the second electrode 320.

The cholesteric liquid crystal (CLC) color filter 230 selectively reflects the incident light. That is, if a molecular structure of the cholesteric liquid crystal (CLC) is twisted clockwise, the cholesteric liquid crystal (CLC) reflects only a right-handed circular polarization. This selective reflection is determined by the helical pitch of the cholesteric liquid crystal (CLC) and a different color can be displayed in each pixel by controlling the helical pitch in each pixel. Accordingly, the reflected light can display the red, green and blue color. Because the cholesteric liquid crystal (CLC) color filter reflects only the light of particular wavelength, the liquid crystal display device that uses the cholesteric liquid crystal (CLC) color filter has a low luminance. Therefore, an amount of the reflected light can be increased by forming the pixel region with the cholesteric liquid crystal (CLC) color filter and the reflection layer that reflects the lights in the whole range of wavelengths in the present invention. The reflection layer may transmit and reflect a part of the incident light.

As it has been described above, the luminance of the liquid crystal display device can be increased by implementing a combination of the cholesteric liquid crystal (CLC) color filter 230, which reflects only the light of particular wavelength, and the reflection layer 240, which reflects the light in the whole range of wavelengths or the entire spectrum of visible light. That is, because the amount of the reflected light is increased with the help of the reflection layer, the luminance of the liquid crystal display device according to the present invention can be improved.

A contrast ratio of the liquid crystal display device usually means a degree of cleanness of displayed image. The contrast ratio is defined as a ratio of a white state luminance to a black state luminance measured in a right front direction of the liquid crystal display device. The displayed image becomes clearer as a difference between those luminances increases. Accordingly, because the luminance of the present invention is increased with the reflection layer 240, the contrast ratio of the liquid crystal display device is improved. In addition, an area ratio between the cholesteric liquid crystal (CLC) color filter 230 and the reflection layer 240 should be determined considering the required color purity and the luminance.

FIG. 4 is a cross-sectional view of a reflective cholesteric liquid crystal (CLC) display device having a CLC color filter according to a second embodiment of the present invention. As shown in the figure, the second embodiment of the present invention has a double-layered cholesteric liquid crystal (CLC) color filter 231 and 232 on the absorption layer 220. The reflection layer 240 is positioned between portions of the double-layered cholesteric liquid crystal (CLC) color filter 231 and 232. Each layer of the cholesteric liquid crystal (CLC) color filter displays same color in the corresponding pixel. However, the wavelength range of the reflected light for displaying the same color is different between the two layers 231, 232. Accordingly, the wavelength range of the reflected light for displaying each color is enlarged as compared with a singled layered cholesteric liquid crystal (CLC) color filter. The reflection layer 240 reflects the lights in the whole range of wavelengths or the entire spectrum of visible light as before in the first embodiment of the present invention. That is, for example, the reflection layer 240 reflects white light. Accordingly, because the amount of the reflected light is increased the luminance of the liquid crystal display device can be much improved. The reflection layer 240 of the first and the second embodiments may be formed of a cholesteric liquid crystal (CLC) polarizer that reflects light in the whole wavelength range of visible light.

FIG. 5 is a cross-sectional view of a reflective cholesteric liquid crystal (CLC) display device having a CLC color filter according to a third embodiment of the present invention. As shown in the figure, the reflection layer 240 is formed on a whole area of the cholesteric liquid crystal (CLC) color filter 230. It is desirable to form the reflection layer 240 in a way that the reflection layer 240 reflects light in the whole range of wavelengths, but reflects only a part of the incident light. By forming a thickness of the reflection layer 240 to be thin, only a part of the incident light is reflected. Accordingly, a part of the incident light transmits through the reflection layer 240 and only a part of the incident light, which has a particular wavelength, is reflected at the cholesteric liquid crystal (CLC) color filter 230. Because the reflection layer 240 reflects, for example, white light, which results in an increase of the amount of the reflected light, the luminance of the cholesteric liquid crystal (CLC) display device can be improved. The reflection layer 240 may be formed of the cholesteric liquid crystal (CLC) polarizer as in the previous embodiments.

It will be apparent to those skilled in the art that various modifications and variation can be made in the fabrication and application of the present invention without departing from the spirit or scope of the invention. Thus, it is intended that the present invention cover the modifications and variations of this invention provided they come within the scope of the appended claims and their equivalents.

What is claimed is:

1. A reflective cholesteric liquid crystal (CLC) display device, comprising:

first substrate;

an absorption layer on the first substrate;

a cholesteric liquid crystal (CLC) color filter on the absorption layer;

a reflection layer on the absorption layer, the reflection layer reflecting light in a range of wavelengths;

a first electrode on the cholesteric liquid crystal (CLC) color filter;

a second substrate spaced apart from and over the first substrate;

a second electrode beneath the second substrate;

a retardation layer on the second substrate;

a polarizer on the retardation layer; and a liquid crystal layer between the first electrode and the second electrode.

2. The device according to claim 1, wherein the reflection layer contacts the cholesteric liquid crystal (CLC) color filter laterally.

3. The device according to claim 2, wherein the reflection layer is formed of cholesteric liquid crystal (CLC) polarizer.

4. The device according to claim 1, wherein the reflection layer is interposed between portions of the cholesteric liquid crystal (CLC) color filter.

5. The device according to claim 1, wherein the reflection layer is formed on a whole area of the first substrate in which the cholesteric liquid crystal (CLC) color filter is formed.

6. The device according to claim 5, wherein the reflection layer is formed of cholesteric liquid crystal (CLC) polarizer.

7. The device according to claim 5, wherein the cholesteric liquid crystal (CLC) color filter has at least two layers that display a same color corresponding to each pixel region, the at least two layers each reflecting light in a different range of wavelengths.

8. The device according to claim 5, wherein the reflection layer is partially transimissive.

9. The device according to claim 1, wherein the range of wavelengths is the spectrum of visible light.

10. The device according to claim 1, wherein the range of wavelengths is a subset of the spectrum of visible light.

11. The device according to claim 1, wherein the range of wavelengths includes at least two colors.

12. The device according to claim 1, wherein the range of wavelengths is a range of wavelengths of ambient light.

13. A method of manufacturing a reflective cholesteric liquid crystal (CLC) display device, comprising:

preparing a first substrate;

forming an absorption layer on the first substrate;

forming a cholesteric liquid crystal (CLC) color filter on the absorption layer;

forming a reflection layer on the absorption layer, the reflection layer capable of reflecting light in a range of wavelengths;

forming a first electrode on the cholesteric liquid crystal (CLC) color filter and on the reflection layer;

preparing a second substrate;

forming a second electrode on the second substrate;

disposing the first substrate and the second substrate so that the first electrode and the second electrode face each other;

injecting liquid crystal between the first electrode and the second electrode; and forming a retardation layer on the second substrate and a polarizer on the retardation layer.

14. The method according to claim 13, wherein the reflection layer contacts the cholesteric liquid crystal (CLC) color filter laterally.

15. The method according to claim 14, wherein the reflection layer formed of cholesteric liquid crystal (CLC) polarizer.

16. The method according to claim 13, wherein the reflection layer is interposed between portions of the cholesteric liquid crystal (CLC) color filter.

17. The method according to claim 13, wherein the reflection layer formed on a whole area of the first substrate in which the cholesteric liquid crystal (CLC) color filter is formed.

18. The method according to claim 17, wherein the reflection layer is partially transimissive.

19. The method according to claim 17, wherein the reflection layer formed of cholesteric liquid crystal (CLC) polarizer.

20. The method according to claim 13, wherein the cholesteric liquid crystal (CLC) color filter has at least two layers that display a same color corresponding to each pixel region, the at least two layers each reflecting light in a different range of wavelength.

21. The method according to claim 13, wherein the range of wavelengths is the spectrum of visible light.

22. The method according to claim 13, wherein the range of wavelengths is a subset of the spectrum of visible light.

23. The method according to claim 13, wherein the range of wavelengths includes at least two colors.

24. The method according to claim 13, wherein the range of wavelengths is a range of wavelengths of ambient light.

* * * * *